(12) United States Patent   (10) Patent No.: US 9,204,381 B2
Engstrom   (45) Date of Patent: Dec. 1, 2015

(54) PROBABILITY CALCULATION OF RAT CANDIDATE

(75) Inventor: Bjorn Engstrom, Hjarup (SE)

(73) Assignee: ST-ERICSSON SA, Plan-les-Ouates (CH)

( * ) Notice: Subject to any disclaimer, the term of this patent is extended or adjusted under 35 U.S.C. 154(b) by 71 days.

(21) Appl. No.: 14/116,523

(22) PCT Filed: Apr. 24, 2012

(86) PCT No.: PCT/EP2012/057460
§ 371 (c)(1),
(2), (4) Date: Dec. 19, 2013

(87) PCT Pub. No.: WO2012/167988
PCT Pub. Date: Dec. 13, 2012

(65) Prior Publication Data
US 2014/0128091 A1    May 8, 2014

Related U.S. Application Data

(60) Provisional application No. 61/494,625, filed on Jun. 8, 2011.

(51) Int. Cl.
*H04W 72/00* (2009.01)
*H04W 48/18* (2009.01)
*H04W 88/06* (2009.01)

(52) U.S. Cl.
CPC .............. *H04W 48/18* (2013.01); *H04W 88/06* (2013.01)

(58) Field of Classification Search
CPC .... H04W 16/14; H04W 72/082; H04W 24/00
See application file for complete search history.

(56) References Cited

U.S. PATENT DOCUMENTS

2009/0312008 A1    12/2009   Lindoff et al.
2012/0252446 A1*   10/2012   Reial et al. ................... 455/434

FOREIGN PATENT DOCUMENTS

WO    2008/114986 A2    9/2008

OTHER PUBLICATIONS

International Search Report issued in corresponding International application No. PCT/EP2012/057460, date of mailing Jun. 5, 2012.

* cited by examiner

*Primary Examiner* — Justin Lee
(74) *Attorney, Agent, or Firm* — Patents Portfolio Builders PLLC

(57) ABSTRACT

An apparatus (200) for use in a telecommunications system. The apparatus (200) comprising a memory (240) and a controller (210). The controller (210) is configured to receive a radio frequency bandwidth and identify a first candidate carrier frequency (710) from the received a radio frequency bandwidth. The controller is further configured to, for a first potential radio access technology determine a probability estimate (Prob) for the first candidate carrier frequency (710) being a carrier frequency of the first potential radio access technology, where in the probability estimate is based on a received power in a transmission band of the first potential radio access technology having the candidate carrier frequency (710) and on a received power in a guard band of the first potential radio access technology having the candidate carrier frequency and from this select a radio access technology based on the probability estimate (Prob) for the candidate carrier frequency (710).

13 Claims, 8 Drawing Sheets

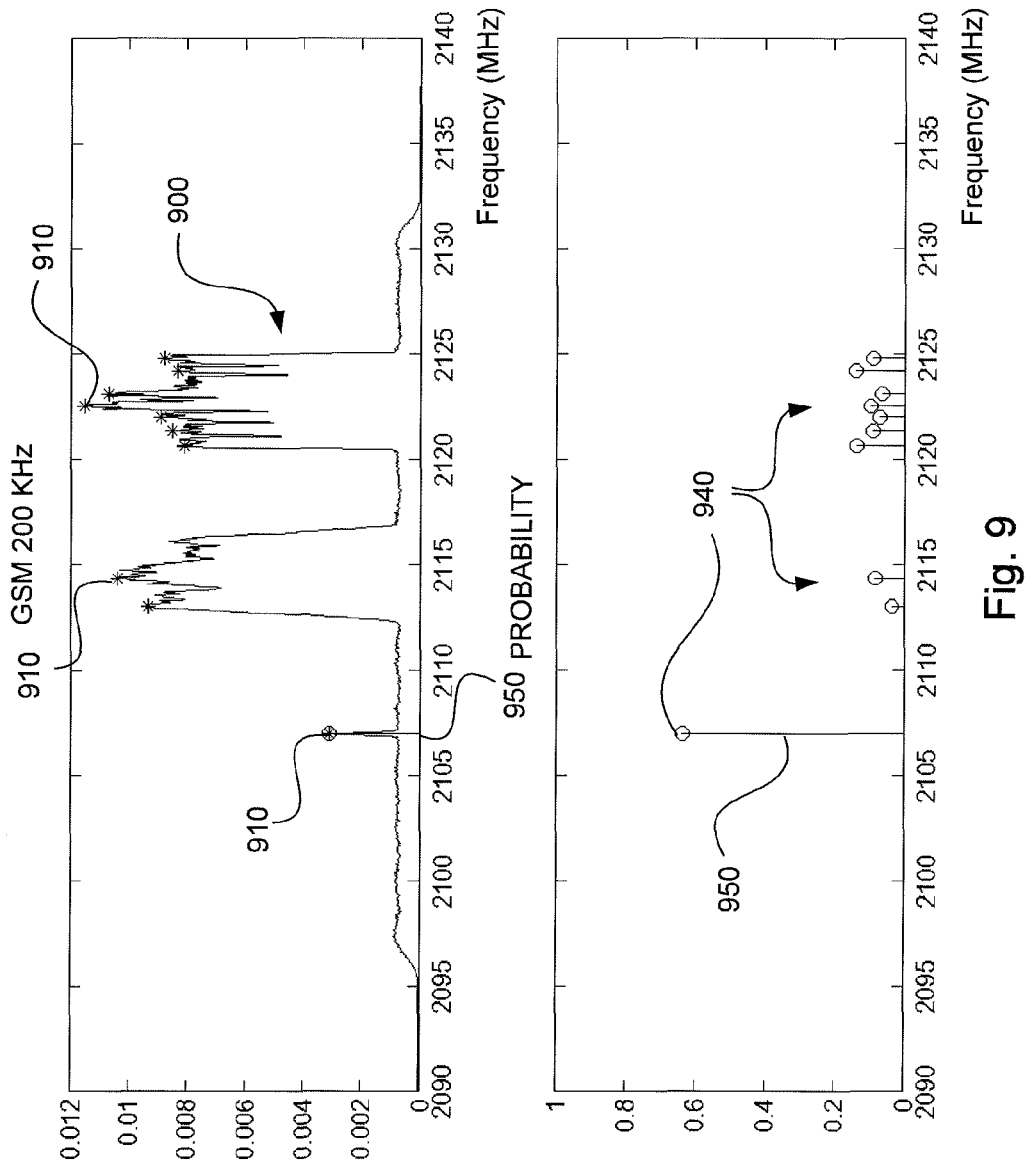

PROBABILITY CALCULATION OF RAT CANDIDATE

TECHNICAL FIELD

This application relates to a method, an apparatus and a computer program product for improved selection of a radio access technology, and in particular to a method, an apparatus a computer program product for improved selection of a radio access technology through a probability calculation based on a frequency spectrum.

BACKGROUND

Mobile communications, such as mobile telephony, is a technology that is continuously gaining an increased user base. Similarly, as new technologies emerge, they will co-exist with older standards. Furthermore, different geographical areas have different communication standards and spectrum planning. As a User Equipment (UE), such as a mobile telephone is switched on it searches for available network carriers according to a stored history list of Radio Access Technologies (RAT) and carriers. Through this list information is available on which RATs are available and at what carrier frequencies, and this makes it easy for a UE to quickly connect to a preferred carrier of a preferred RAT. However, looking at all possible cellular environments a UE might experience at different places of the world, it is obvious that it is of importance to quickly find a suitable network to camp on once the UE is switched on at a new geographical position where the stored history list of RATs and carriers are not valid.

The classical RAT detection and cell search approach uses Received (RX) energy detection over a grid of test locations in frequency, followed by synchronization attempts with different RAT formats. For each candidate location, the Radio Frequency (RF) stage is tuned to the corresponding frequency and the received energy is evaluated. However, the traditional approach is becoming increasingly inefficient as the hypothesis grid becomes denser, the number of bands increases, and the set of possible RATs grows.

The American patent application US2007217550 discloses a system having a signal processor for detection of a signal type of a signal. One embodiment is designed to determine a first variable which is characteristic of a first spectrum element of the signal spectrum, and to determine a second variable which is characteristic of a second spectrum element of the signal spectrum, a system for determination of a ratio between the first variable and the second variable, and a detector which is designed to detect the signal type on the basis of the ratio.

The American patent application US2011045781 discloses techniques for sensing wireless communications in television frequency bands, which may be implemented by a sensing device comprising a sensing unit, a power spectral density (PSD) estimation unit, a filter unit, a candidate selection unit, an analysis unit and a decision unit. The sensing unit senses a signal in the television frequencies bands. The PSD estimation unit calculates an estimate of a PSD for the sensed signal. The filter unit filters the estimated PSD. The candidate selection unit analyzes the filtered PSD to identify a candidate frequency representative of a potentially in use frequency. The analysis unit computes a test statistic for the candidate frequency. The decision unit compares the test statistic to a threshold to identify whether the candidate frequencies is actively in use by wireless communication devices.

The techniques disclosed in these two patent applications are aimed at finding or estimating bandwidths of signals and are not suited for signals which are of a flat character and subsequently not suited for detecting RATs such as WCDMA and LTE. They are also not suited for use in a packed frequency environment where different signals may be so closely arranged (or even overlap) that their bandwidths are not distinguishable from one another.

To make the process of finding a RAT to connect to faster, The European patent application EP08853764.2, which is incorporated herein by reference, has introduced a Fast Fourier Transformation (FFT) scan over a frequency band, in order to get a power spectral density estimate, and then via matched filters in frequency domain be able to detect cellular systems employing different bandwidths. Frequency domain scanning speeds up the cell search process significantly, as the probable carrier frequency is established quite exactly prior to performing a synchronization attempt. Furthermore, in terminals with Long Term evolution (LTE) functionality (LTE being one example of a RAT), this approach leads to negligible incremental complexity, since the existing FFT hardware may be used for the scanning operation.

With the FFT scan as described above, it is possible to localize transmission bands, and distinguish between bands of different bandwidths. However, only looking at the matched filter outputs, there are problems discriminating between some RAT configurations. For instance, a Wideband Code Division Multiple Access (WCDMA) carrier and a 5 MHz LTE carrier occupy a frequency region of approximately the same width. Similarly, several adjacent WCDMA carriers could be confused with a 10 or 20 MHz LTE carrier. In the first stage of LTE deployments, mixed WCDMA and LTE carrier allocations are expected to be commonplace, as well as mixes of GSM and WCDMA deployment which already exist, and this gives and will give rise to frequent ambiguity. Extending this to include GSM too even more mix-up can occur. For example as in detecting GSM spectral density as part of a WCDMA cell. Thus, in order to determine the correct RAT according to the prior art method, synchronization attempts according to all relevant possible carrier configurations (RAT, Bandwidth (BW), etc.) should be carried out, once a presumed carrier or a carrier set is identified. This leads to notable extra time expenditure in the initial connection establishment and cell search process.

Thus, it is of interest to develop methods and apparatus to quickly be able to distinguish between different RATs or RAT combinations that may occupy the same bandwidth, without having to resort to explicit RAT-specific synchronization procedures. One problem to be solved is thus to cope with first time synchronization, or when the signal environment has changed significantly, e.g. switching on the communication apparatus in a new geographical situation. This problem has been solved by EP08853764.2. This solution is, however, somewhat limited. There is thus a need for an alternative solution to this problem.

Another approach is to receive signals present in a frequency range; transforming received signals into frequency domain; estimating power spectral density from transformed signals; estimating probability of different communication modes by correlating the estimated power spectral density with power spectral density signatures of said different communication modes; and performing cell search according to estimated most probable communication mode.

Still, when different operation modes have power spectral density signatures that resembles each other, it may be hard to determine which the correct communication mode is since more than one seems to be probable.

There is thus a need for an apparatus that is able to quickly ascertain what available RATs exist and to be able to discern between different RATs even in an environment where different carriers operate on carrier frequencies that are closely arranged in a frequency range and that is suitable for channels having a frequency spectrum being of a flat character.

SUMMARY

It is an object of the teachings of this application to overcome the problems listed above by providing an apparatus (200) for use in a telecommunications system, said apparatus (200) comprising a memory (240) and a controller (210), wherein said controller (210) is configured to receive a radio frequency bandwidth, identify a first candidate carrier frequency (710) from the received a radio frequency bandwidth, for a first potential radio access technology determine a probability estimate (Prob) for the first candidate carrier frequency (710) being a carrier frequency of the first potential radio access technology, where in the probability estimate is based on a received power in a channel band of the first potential radio access technology having the candidate carrier frequency (710) and on a received power in a guard band of the first potential radio access technology having the candidate carrier frequency, select a radio access technology based on the probability estimate (Prob) for the candidate carrier frequency (710).

In one embodiment, the controller (210) is further configured to determine said probability estimate (Prob) for the first candidate carrier frequency (710) by determining a size and location of at least one guard band according to the first potential radio access technology, determining an average received power in the channel band of the first potential radio access technology having the candidate carrier frequency (710), determining an average received power in the at least one guard band of the first potential radio access technology having the candidate carrier frequency, determining a difference between said average received power in the channel band and said average received power in the at least one guard band, and determining said first probability estimate (Prob) by determining a quota between the difference and said average received power in the channel band.

In one embodiment, the controller (210) is further configured to determine a size and location of at least one guard band according to the first potential radio access technology and to determine a average received power in said at least one guard band, determine an average received power in the channel band of the first potential radio access technology having the candidate carrier frequency (710) and to determine said probability by determining a quota between the average received power in said at least one guard band and the average received power in the channel band. Determining the probability estimate as a quota based on the guard bands and the channel band allows for consideration to be taken not only to the power level, but how well the shape of the candidate confers with the potential radio access technology.

In one embodiment, the controller (210) is further configured to determine the average received powers using a logarithmic scale, and wherein the controller (210) is configured to determine a size and location of a transmission band according to the first potential radio access technology; determine an average received power in the channel band of the first potential radio access technology having the candidate carrier frequency (710) using a logarithmic scale; determine an average received power in the transmission band of the first potential radio access technology having the candidate carrier frequency using a logarithmic scale; and determine said first probability estimate (Prob) by determining a logarithmic difference between the average received power in the transmission band and the average received power in the channel band.

In one embodiment, the controller (210) is further configured to determine the average received powers using a logarithmic scale, and wherein the controller (210) is configured to determine a size and location of at least one guard band according to the first potential radio access technology and to determine an average received power in said guard band, determine an average received power in the channel band of the first potential radio access technology having the candidate carrier frequency (710) and to determine said probability by determining a logarithmic difference between the average received power in said at least one guard band and the average received power in the channel band.

The use of logarithmic scales has the benefit that rounding operations and small fluctuations have a lesser impact on the operations.

In one embodiment, the controller (210) is further configured to determine a probability for the first candidate carrier frequency (710) being a channel of a second potential radio access technology. This allows for determining the probability that a candidate carrier frequency is a carrier frequency of a potential radio access technology for more than one radio access technology.

In one embodiment, the controller (210) is further configured to identify a second candidate carrier frequency (710) and determine a probability for said second candidate carrier frequency (710) being a channel of a radio access technology. This allows for comparing the probability of more than one candidate carrier frequency.

In one embodiment, the controller (210) is further configured to sort said first candidate carrier frequency (710) according to said probability estimate (Prob). This allows for a simple selection.

In one embodiment, the controller (210) is further configured to identify a candidate carrier frequency (710) by performing a FFT scan over a frequency band, in order to get a power spectral density estimate, and thereafter detect cellular systems employing different bandwidths by applying a radio access technology matching filter and thereby identifying at least one candidate carrier frequency (710) of a radio access technology.

In one embodiment, the controller (210) is further configured to identify a candidate carrier frequency (710) as being every frequency in a received bandwidth and perform a sweeping probability calculation and thereby determining a probability estimate (Prob) for each frequency in the received bandwidth.

In one embodiment, the controller (210) is further configured to identify a candidate carrier frequency (710) by performing a FFT scan over a frequency band and applying a matching filter designed to filter low energy signals thereby identifying at least one candidate carrier frequency (710) of a radio access technology.

It is a further object of the teachings herein to provide a mobile communications device (100) comprising an apparatus (200) according to above.

It is a further object of the teachings herein to provide a method for use in a telecommunications system. The method comprises receiving a radio frequency bandwidth, identifying a first candidate carrier frequency (710) from the received a radio frequency bandwidth, for a first potential radio access technology determining a, probability estimate (Prob) for the first candidate carrier frequency (710) being a carrier frequency of the first potential radio access technology, where in the probability estimate is based on a received power in a transmission band of the first potential radio access technology having the candidate carrier frequency (710) and on a received power in a guard band of the first potential radio access technology having the candidate carrier frequency, and selecting a radio access technology based on the probability estimate (Prob) for the candidate carrier frequency (710).

It is a further object of the teachings herein to provide a computer program product comprising a computer readable medium, having thereon a computer program comprising program instructions, the computer program being loadable into a data-processing unit and adapted to cause execution of the method according to above when the computer program is run by the data-processing unit.

By enabling an apparatus, as disclosed herein, to utilize that RATs have a known channel bandwidth and a transmission bandwidth where the transmission bandwidth is less than the channel bandwidth, i.e. has so called guard bands, it is possible to quickly and efficiently, without any synchronization attempts and by only analyzing an energy spectrum, calculate a probability that a found signal is a channel of a specific RAT. For LTE specifications, example guard bands and transmission bands can be found in the 3GPP (3rd Generation Partner Project) standard document 36.101, Table 5.6-1 and for WCDMA example guard bands and transmission bands can be derived from the 3GPP standard document 25.101.

Embodiments of the apparatus as disclosed herein may find beneficial use in a telecommunications apparatus in that once a potential spectral density signature or candidate has been detected, i.e. a specific RAT, bandwidth and carrier frequency, a probability estimate calculation as disclosed herein can be used. In short, an example probability estimate calculation utilizes the ratio between the mean power of the transmission band and the mean power of the assumed (or hypothesized) carrier bandwidth. This will give a unit-less number between 0 and 1 that can be used to decide which carrier frequency to tune into and what RAT (and what bandwidth for LTE) to use. The mean power of the assumed (or hypothesized) carrier bandwidth may be defined as the mean power of the transmission band (then the nominator will be approximated to the mean power of the assumed (or hypothesized) carrier bandwidth minus the mean power of the guard band) or alternatively as the mean power of the transmission band plus the mean power of the guard band (then the nominator is equal to the mean power of the assumed (or hypothesized) carrier bandwidth minus the mean power of the guard band). It should be noted that one example probability estimate calculation is based on the ratio between the mean power of the guard band and the mean power of the assumed (or hypothesized) carrier bandwidth. This will give a unit-less number between 1 and 0 that can be used to decide which carrier frequency to tune into and what RAT (and what bandwidth for LTE) to use.

At least some of the teachings herein may find beneficial use in an apparatus, such as a circuit, to be comprised in a user equipment, such as a mobile telecommunications device for example being a mobile telephone, a wireless modem, a Personal Digital Assistant or any mobile device capable of wireless telecommunication in a telecommunications system according to a RAT. Examples of such telecommunications systems are systems adhering to standards for example governed by the standardization body 3GPP ($3^{rd}$ Generation Partnership Project), such as LTE (long Term Evolution), LTE Advanced, GSM (Global System for Mobile Communications), GPRS (General Packet Radio Service), EDGE (Enhanced Data rates for GSM Evolution), or UMTS (Universal Mobile Telecommunications System), to name a few. Such telecommunications systems may be implemented using RATs such as TDMA (Time Division Multiple Access), WCDMA (Wideband Code Division Multiple Access), TDD (Time Division Duplex), FDD (Frequency Division Duplex, OFDM (Orthogonal Frequency Division Multiplexing), WCDMA/TD-SCDMA (WCDMA Synchronous CDMA and Time Division WCDMA Synchronous CDMA), to name a few.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The actions of any method disclosed herein do not have to be performed in the exact order disclosed, unless explicitly stated.

BRIEF DESCRIPTION OF DRAWINGS

Embodiments of the invention will be described in further detail under reference to the accompanying drawings in which:

FIG. 9 shows a graph for a detected radio signal received at an apparatus and the calculated probabilities for the received signal according to one embodiment of the teachings of this application.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete. Like numbers refer to like elements throughout.

Figure 1:
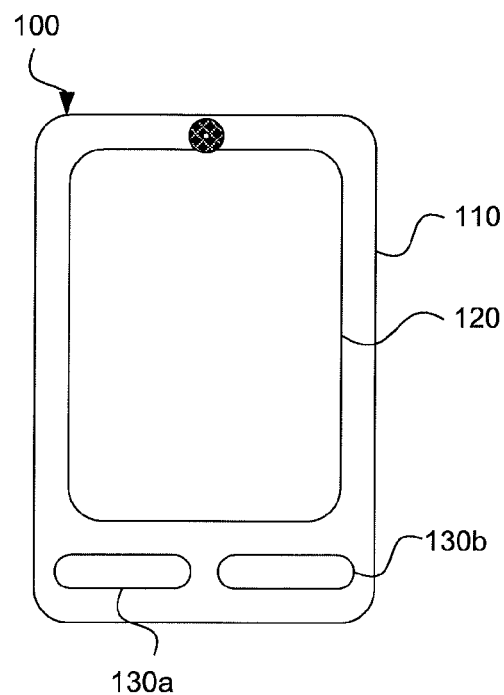
FIG. 1 shows a schematic view of a mobile telecommunications device comprising an apparatus according to one embodiment of the teachings of this application.

FIG. 1 shows a schematic overview of a mobile communications device 100 adapted according to the teachings herein. In the embodiment shown the mobile communications device is a mobile phone 100. In other embodiments the mobile communications device 100 is a personal digital assistant, a media player or any (hand-held) device capable of communicating with other devices over a telecommunications system. The mobile communications device 100 can also be a modem or a laptop computer having telecommunications capabilities. The mobile phone 100 comprises a housing 110 in which a display 120 is arranged. In one embodiment the display 120 is a touch display. In other embodiments the display 120 is a non-touch display. Furthermore, the mobile phone 100 comprises two keys 130a, 130b. In this embodiment there are two keys 130, but any number of keys is possible and depends on the design of the mobile phone 100. In one embodiment the mobile phone 100 is configured to display and operate a virtual key on the touch display 120. It should be noted that the number of virtual keys are dependant on the design of the mobile phone 100 and on an application that is executed on the mobile phone 100. In one embodiment the device 100 comprises an ITU-T keypad or a QWERTY (or equivalent) keypad in addition to or as an alternative to a touch-sensitive display. In an embodiment where the keypad is an alternative to a touch-sensitive display, the display 120 is a non-touch-sensitive display.

Figure 2:
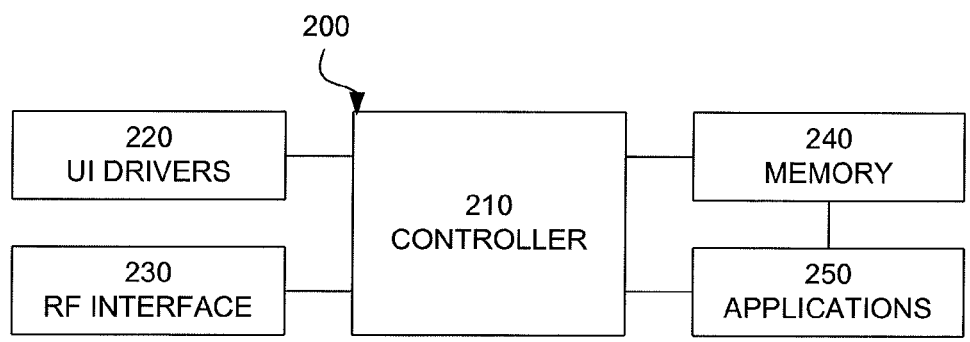
FIG. 2 shows a schematic view of the general structure of an apparatus according to one embodiment of the teachings of this application.

FIG. 2 shows a schematic view of the general structure of an apparatus that can be comprised in a device according to FIG. 1. The apparatus can be an electronic circuit, such as an ASIC (Application Specific Integrated Circuit) or an arrangement of electronic circuits. The apparatus 200 comprises a controller 210 which is responsible for the overall operation of the apparatus 200 and may for example be implemented by any commercially available CPU ("Central Processing Unit"), DSP ("Digital Signal Processor") or any other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The controller 210 is configured to read instructions from the memory 240 and execute these instructions to control the operation of the apparatus 200. The memory 240 may be implemented using any commonly known technology for computer-readable memories such as ROM, RAM, SRAM, DRAM, CMOS, FLASH, DDR, EEPROM memory, flash memory, hard drive, optical storage or any combination thereof. The apparatus 200 further comprises one or more applications 250. The applications are sets of instructions that when executed by the controller 210 control the operation of the apparatus 200. The memory 240 is used for various purposes by the controller 210, one of them being for storing application data and application instructions 250 for various software modules in the apparatus 200. The software includes a real-time operating system and possibly drivers for a man-machine interface 220 and an application handler as well as various applications 250. The applications 250 may relate to functions of a device incorporating the apparatus 200, such as the mobile telecommunications device 100, and can include a messaging application for short messaging service (SMS), multimedia messaging service (MMS) and electronic mail, a media player application, as well as various other applications 250, such as applications for voice calling, video calling, web browsing, document reading and/or document editing, an instant messaging application, a phonebook application, a calendar application, a control panel application, one or more video games, a notepad application, location finding applications, etc.

The apparatus 200 may further comprise user interface drivers 220 adapted to operate with a user interface, which user interface in the mobile device 100 of FIG. 1, comprises the display 120, the keys 130, 135 and a loudspeaker 150. The user interface drivers 220 also include one or more hardware controllers, which together with the UI drivers cooperate with the display 120, and the keypad 130 as well as with various other I/O devices such as the microphone, a speaker, a vibrator, a ringtone generator, an LED indicator, etc. As is commonly known, the user may operate the mobile telecommunications device 100 and the apparatus 200 through the man-machine interface thus formed.

The mobile device 200 further comprises a radio frequency interface 230, which is adapted to allow the mobile device to communicate with other devices through a radio frequency band through the use of different radio frequency technologies. Examples of such technologies are W-CDMA, GSM, UTRAN, LTE and NMT to name a few. The controller 210 is configured to operably execute communication applications 250 such as the voice call and SMS applications through the RF interface 230, and optionally a Bluetooth interface and/or an IrDA interface for local connectivity, and software stored in the memory 240, which software includes various modules, protocol stacks, drivers, etc, to provide communication services (such as transport, network and connectivity) for the apparatus 200. The RF interface 230 comprises an internal or external antenna as well as appropriate radio circuitry for establishing and maintaining a wireless link to a base station. As is well known to a person skilled in the art, the radio circuitry comprises a series of analogue and digital electronic components, together forming a radio receiver and transmitter. These components include, i.e., band pass filters, amplifiers, mixers, local oscillators, low pass filters, AD/DA converters, etc.

Figure 3:
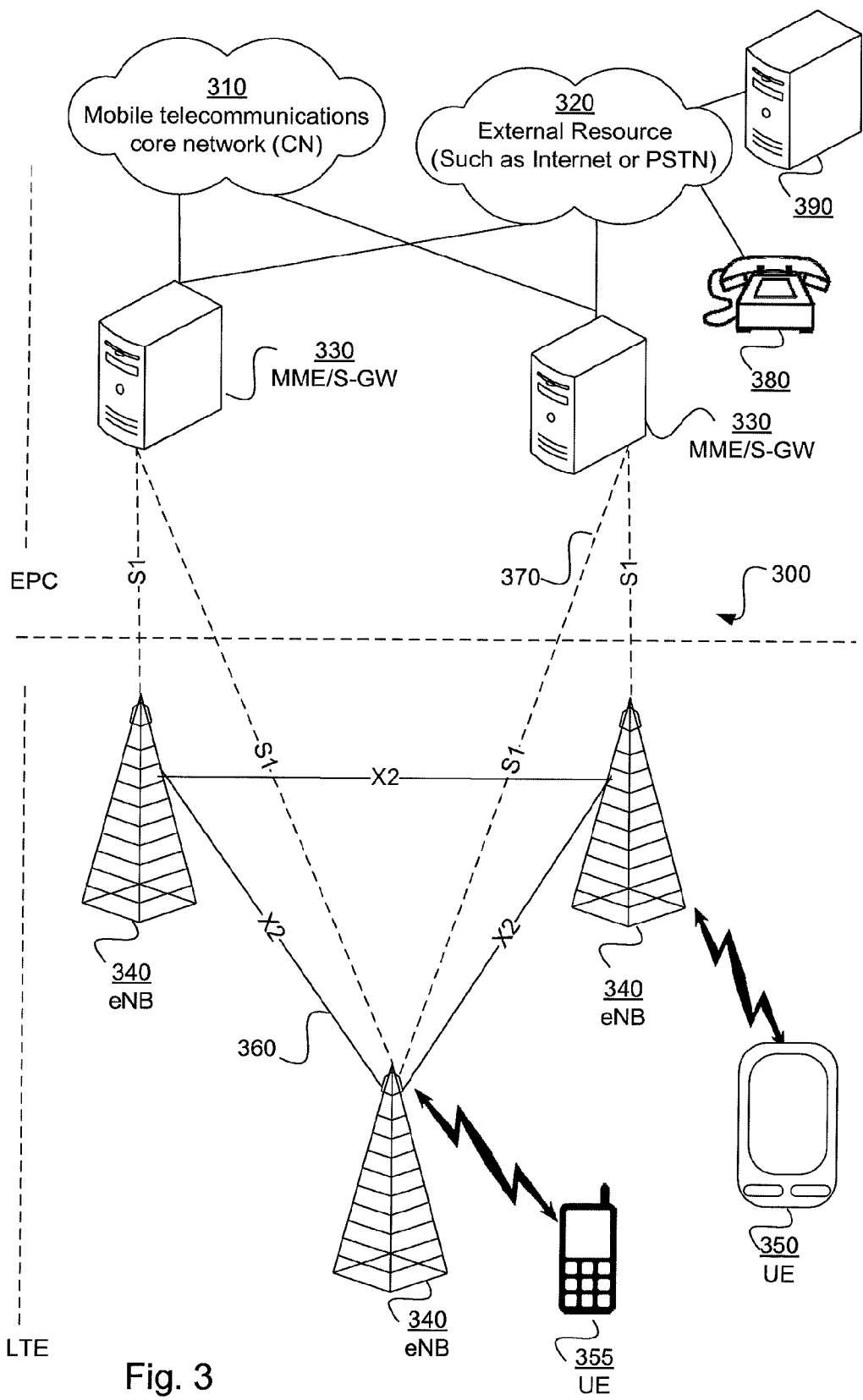
FIG. 3 shows a schematic view of a telecommunications system comprising an apparatus according to one embodiment of the teachings of this application.

FIG. 3 shows a schematic view of the general structure of a telecommunications system 300 according to the teachings herein. In the telecommunication system of FIG. 3, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 100, 350 according to the disclosed embodiments and other devices, such as another mobile terminal 355 or a stationary telephone 380. The mobile terminals 350, 355 are connected to a mobile telecommunications network 310 through Radio Frequency links via base stations 340.

The telecommunications system 300 comprises at least one server 330. A server 330 has a data storage and a controller, for example implemented by any commercially available CPU ("Central Processing Unit"), DSP ("Digital Signal Processor") or any other electronic programmable logic device. In one embodiment such a server is a Mobility Management Entity (MME) and/or a Gateway (GW). In FIG. 3 two such servers 330 are shown. The servers 330 are configured to communicate with a mobile telecommunications core network (CN) 310 and/or an external resource 320 such as the Internet or a Public Switched Telephone Network (PSTN). A PSTN 320 is configured to communicate with and establish communication between stationary or portable telephones 380. In one embodiment the external resource comprises or is configured to communicate with an external service provider 390. In one embodiment the servers 330 are configured to communicate with other devices using a packet switched technology or protocol. In such an embodiment the servers 330 may make up an Evolved Packet Core (EPC) layer.

The servers are configured to communicate with nodes, also referred to as base stations 340. In one embodiment the base station 340 is an evolved Node Base (eNB). A base station 340 is further configured to communicate with one or more servers 330. In one embodiment the communication between a server 330 and a base station 340 is effected through a standard or protocol 370. In one embodiment the protocol is S1. A base station 340 is configured to communicate with at least one other base station 340. In one embodiment the communication between a base station 340 and another base station 340 is effected through a standard or protocol 360. In one embodiment the protocol 360 is X2. A base station, such as the base station 340 in FIG. 3, is further configured to handle or service a cell. In one embodiment the at least one base stations 340 make up a Long Term Evolution (LTE) layer. In one embodiment the at least one base stations 340 make up an LTE Advanced layer.

In one embodiment the base station 340 is configured to communicate with a mobile telecommunications device 350 (100) through a wireless radio frequency protocol.

In one embodiment the telecommunications system 300 is an Evolved Packet System (EPS) network. In one embodiment the telecommunications system is a system based on the 3GPP ($3^{rd}$ Generation Partnership Project) standard. In one embodiment the telecommunications system is a system based on the UMTS (Universal Mobile Telecommunications System) standard. In one embodiment the telecommunications system is a system based on a telecommunications standard such as WCDMA, GSM, D-AMPS, CDMA2000, FOMA or TD-SCDMA to name a few. In an embodiment where the telecommunications system is a W-CDMA system the servers 330 of FIG. 3 may be Radio Network Controllers.

Figures 4A, 4B:
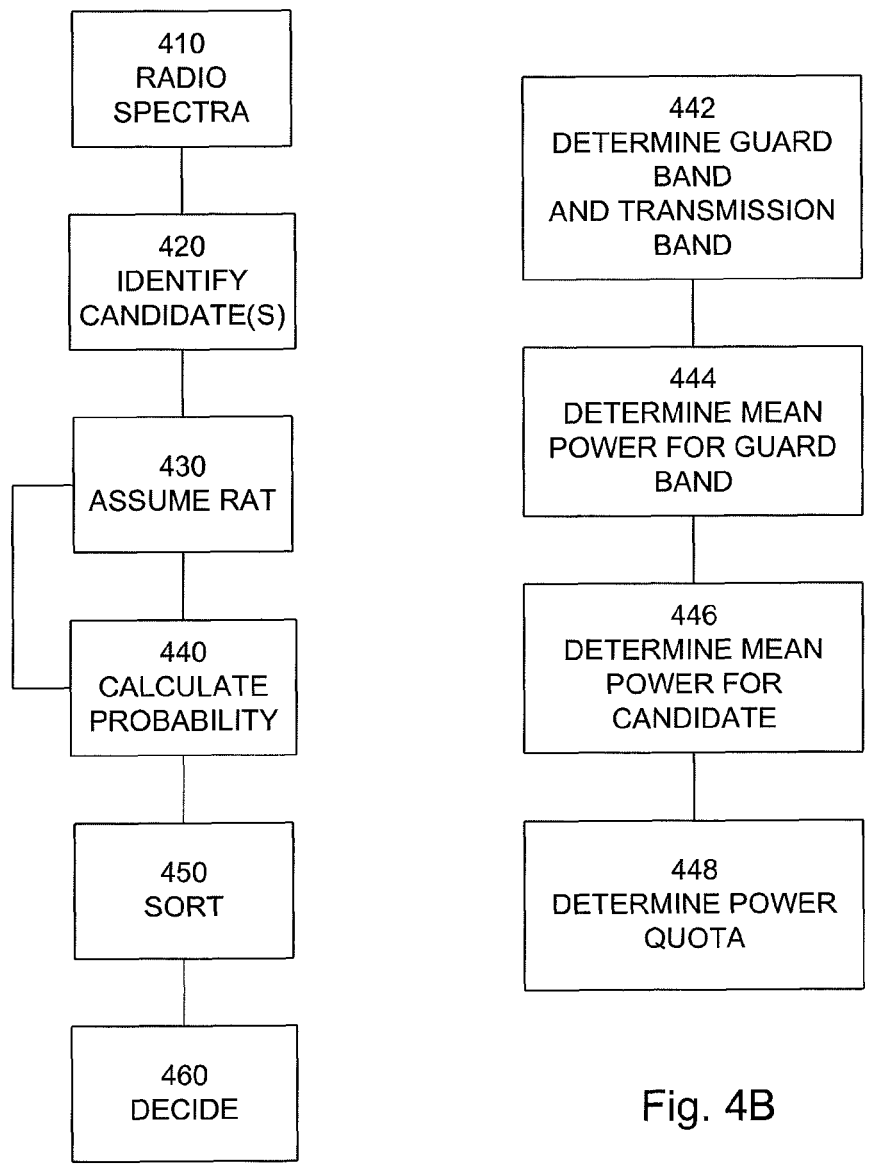
FIG. 4A shows a flowchart for a method according to one embodiment of the teachings of this application.
FIG. 4B shows a flowchart for a method according to one embodiment of the teachings of this application

FIG. 4A shows a flowchart of a general method according to some embodiments. First (in 410) an apparatus 200, for example housed in a mobile telecommunications device 100, receives radio signals through a radio interface 230, and the controller 210 of the apparatus 200 determines a Power Spectral Density. In one embodiment the controller is configured to determine the Power Spectral Density by performing a Fast Fourier Transformation (FFT) of the received radio signals. The controller may further be configured to identify a candidate carrier frequency (in 420) from the Power Spectral Density. In one embodiment the candidate carrier frequency is identified in the same manner as has been disclosed in the European Patent application EP08853764.2.

In a signal reception step, a signal present in a fairly broad spectrum, i.e. within which a desired signal is expected, is received. This fairly broad reception bandwidth can for example be 20 MHz. Even broader reception bandwidths are possible. The reception can comprise an initial step comprising assigning frequency range of reception of signals, and tuning of gain control for the reception. The signals are then received in a signal reception step. Received signal strength indicator (RSSI) is determined for the received signals and compared with a threshold in an RSSI checking step. Here, it should be noted that RSSI can be determined for a certain bandwidth, or that several RSSI values may be determined over a certain bandwidth, such as an RSSI scan. In the latter case, the RSSI value can be considered as a vector. If RSSI is below the threshold, i.e. the signal is too weak, the process returns to the initial step, where frequency range and gain control may be adjusted before making another attempt to receive proper signals. If RSSI is above the threshold, the processing continues to further processing according to the method of the present invention, i.e. transformation, estimation, etc. The assignment of a threshold value should take account on the way, as demonstrated above, that the RSSI was determined to provide comparable values.

The received signal can be converted to digital form to enable the further processing of the signal by digital processing means. In a transformation step, the received signal is transformed into frequency domain. This can for example be performed by Fast Fourier Transform (FFT), Discrete Fourier Transform (DFT), Discrete Cosine Transform (DCT), or any other suitable transform approach. From the transformed signal, a power spectral density (PSD) of the signal is estimated in a PSD estimation step. The estimation can comprise averaging of the signal over time. The estimation can also comprise other filtering, such as smoothening over frequencies. The estimation can also comprise providing a normalized PSD for easier further processing. As a proper PSD of the received signal is established, this is compared with stored PSD signatures of the different communication modes in question in a communication mode probability estimation step. The comparison can comprise correlating the PSD with the stored PSD signatures, such that correlation values show peaks where the PSD and any PSD signature match.

In the received signal, signal patterns with different shapes, bandwidths and signal strengths can be found. These are correlated to PSD signatures according to what is demonstrated above. To make this even more efficient, local peaks can be determined, i.e. good signals believed to hold a feasible communication mode signal, and correlation are done around these peaks. The correlation then gives metrics on best cellular system matches including estimates of carrier frequency for them thereby identifying at least one candidate carrier frequency.

It should be noted that further details regarding the establishing of a possible candidate carrier frequency may be found in the European Patent application EP08853764.2 and that such details are expressly incorporated herein by reference.

In one embodiment the controller 210 is configured to perform a sweeping probability calculation of the generated frequency spectrum. In such an embodiment the controller 210 is configured to apply a window over the frequency spectrum and perform a probability calculation within that window to ascertain whether a candidate is likely or not to be represented within the window. In such an embodiment the identifying of a candidate is done so that all frequencies are taken to be a candidate in turn. Thus, the probability estimates, as are described below, are done for all frequencies in the received band width. In one embodiment the probability estimations are performed in parallel.

In one embodiment the controller 210 is configured to candidate carrier frequency (710) by performing a FFT scan over a frequency band and applying a matching filter designed to filter low power signals thereby detecting a possible bandwidth which is matched against possible radio access technology modes. The candidate carrier frequency is then determined from the known properties of the possible radio access technologies.

The controller 210 is further configured to assume (or hypothesize) (in 430) that the found candidate is a channel of a first radio access technology (RAT) and to calculate a probability value that the candidate is a channel according to the assumed (or hypothesized) RAT 440.

FIG. 4B is a flowchart showing a method of determining such a probability value according to one embodiment of the teachings herein. By assuming that the candidate is a channel of a known RAT certain features of the channel can be assumed (or hypothesized) to be known. These features include channel bandwidth, transmission bandwidth and guard bandwidth. Examples of such bandwidths are given in table 1. By knowing the carrier frequency it is easy to determine the transmission band and the guard band (in 442) through their respective bandwidths which are known for an assumed (or hypothesized) RAT and easily obtainable from the standard documents for the relevant RAT. The controller 210 is thus configured to determine the size and location of the guard band. In one embodiment the controller 210 is configured to determine the guard band as having first starting frequency=carrier frequency−transmission bandwidth/2−guard bandwidth and having first ending frequency=carrier frequency−transmission bandwidth/2 and having second starting frequency=carrier frequency+transmission bandwidth/2 and having second ending frequency=carrier frequency+transmission bandwidth/2+guard bandwidth.

In one embodiment the guard band is determined to be broader than as specified above. In one embodiment the guard band is determined to be narrower than as specified above. In one embodiment the guard band is determined to be closer to the candidate carrier frequency. In one embodiment the guard band is determined to be further away from the candidate carrier frequency.

The controller 210 calculates (in 444) the mean power of the guard band Pg and also calculates (in 446) the mean power for the candidate Pc. In one embodiment the mean power for the candidate is calculated to be the mean power of the whole channel bandwidth, that is, the transmission band and the guard band. It should be noted that the power levels may be expressed in decibel (dB) using a logarithmic scale or in Watts (W) using a linear scale and the powers can be calculated either using a linear scale or a logarithmic scale. The following equations are given in the linear domain. Using a logarithmic scale has the benefit that rounding operations has a lesser influence on the values.

It should also be noted that corresponding energy measures may be used instead of the power measures for equivalent result.

The controller 210 further calculates a difference deltaP (ΔP) between the mean powers according to the Equation 1 below and then determines (in 448) a quota of the power according to Equation 2 below. The quota is calculated to have a unitless number falling between 0 and 1 and is thus a useful indication Prob of the probability that the candidate is a channel of the assumed (or hypothesized) RAT.

$$\Delta P = Pc - Pg \qquad \text{Equation 1}$$

$$Prob = \frac{\Delta P}{Pc} = \frac{Pc - Pg}{Pc} \qquad \text{Equation 2}$$

The controller 210 is further configured to repeat these determinations and calculate another probability for a second RAT, by assuming that the identified frequency channel is a carrier frequency of each (or at least some of) the known RATs. The controller 210 is also configured to repeat these determinations for each candidate that can be found in the power (or energy) spectrum.

In one embodiment the controller 210 is configured to determine the probabilities for each candidate by first finding all the candidates and then assuming each RAT for each candidate in turn.

In one embodiment the controller 210 is configured to determine the probabilities for each candidate by first finding a candidate and assuming each RAT for the candidate and then repeating for a second candidate. In one such embodiment the controller 210 may be configured to stop finding candidates when a candidate has provided a high probability value for a specific RAT. In one embodiment a probability value is considered to be high if it exceeds a threshold level. Examples of such threshold levels are 0.5, 0.6, 0.7, 0.75, 0.80, 0.85, 0.9, 0.95 and 0.97. The threshold may be fixed or adaptive based on circumstances and preferences. This allows for a faster connection to a specifically wanted RAT as the process of finding all candidates and available channels can be interrupted when a good candidate is found.

In one embodiment the determinations of probabilities are made in parallel with the identifications of a candidate.

The controller 210 then sorts the candidates (in 450) in order of probabilities. The sorting can be achieved specific to a RAT. That is, the candidates are sorted according to their probability to be a channel of a specific RAT. This allows the controller to decide which candidate is the most likely for a specific RAT. The candidates can alternatively be sorted according to the highest probability, possibly independent of the assumed (or hypothesized) RAT. This allows for finding a candidate having a highly likely identified RAT for fast connection.

The controller 210 may then decide (460) which candidate carrier to use according to the probability and possibly also according to a preferred RAT.

Though this description is exemplified using two examples: WCDMA vs LTE 5 MHz and GSM vs WCDMA/LTE 5 MHz it should be noted that the invention is directly applicable for any kind of multicarrier signals such as semi-loaded LTE cells, multiple adjacent WCDMA cells or LTE cells vs. larger LTE cells. This probability measure can be used for deciding on which carrier a user equipment is to be connected to.

As stated above a feature of the teachings herein is to utilize the channel bandwidth versus the transmission bandwidth. For LTE TDD/FDD (Time Division Duplex/Frequency Division Duplex) the channel bandwidth and transmission bandwidth are specified in the 3GPP standard document 35.101, Table 5.6-1, Table 1 of this application shows the channel bandwidth, transmission bandwidth and the (calculated) guard bands for LTE channels having bandwidths between 1.4 MHz and 20 MHz.

For FDD (Frequency Division Duplex) WCDMA the channel bandwidth is 5 MHz and a transmission bandwidth of 3.84 MHz (i.e. chip rate of 3.84 Mcps) (as disclosed in 3GPP standard document 25.101). That is, there is a guard band of 580 kHz on each side of the transmission band. This is similar for TDD (Time Division Duplex) UMTS, TD-SCDMA.

For GSM the channel bandwidth is 200 kHz but doesn't have a well-defined transmission bandwidth. Instead, a minimum adjacent carrier interference of for example 9 dB suppression at 100 kHz offset which can be used in the same way.

Figure 7:
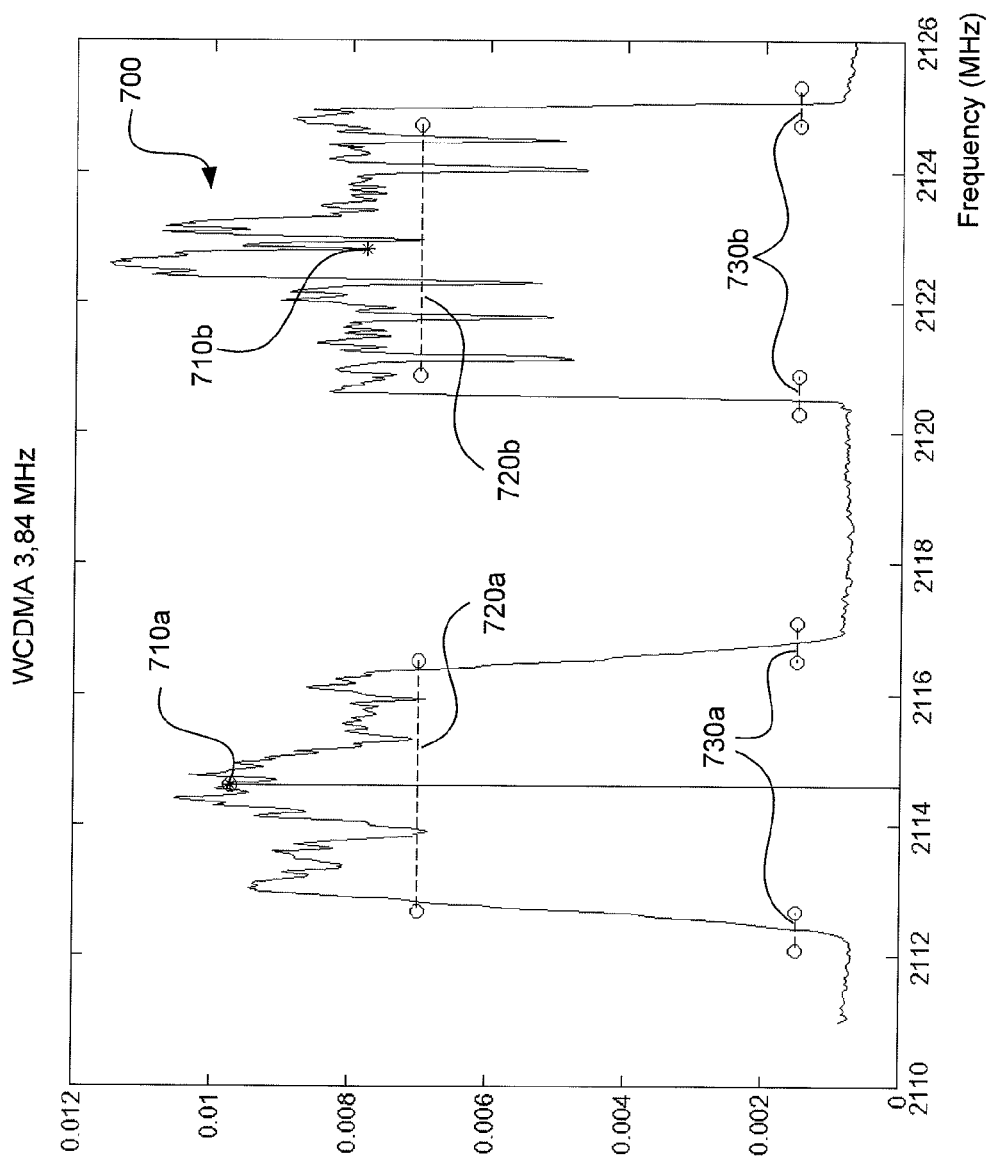
FIG. 7 shows a graph for a detected radio signal received at an apparatus according to one embodiment of the teachings of this application.

FIG. 7 shows an example of how the WCDMA region maps to a WCDMA cell and a LTE 5 MHz cell in a frequency spectrum.

Figure 5:
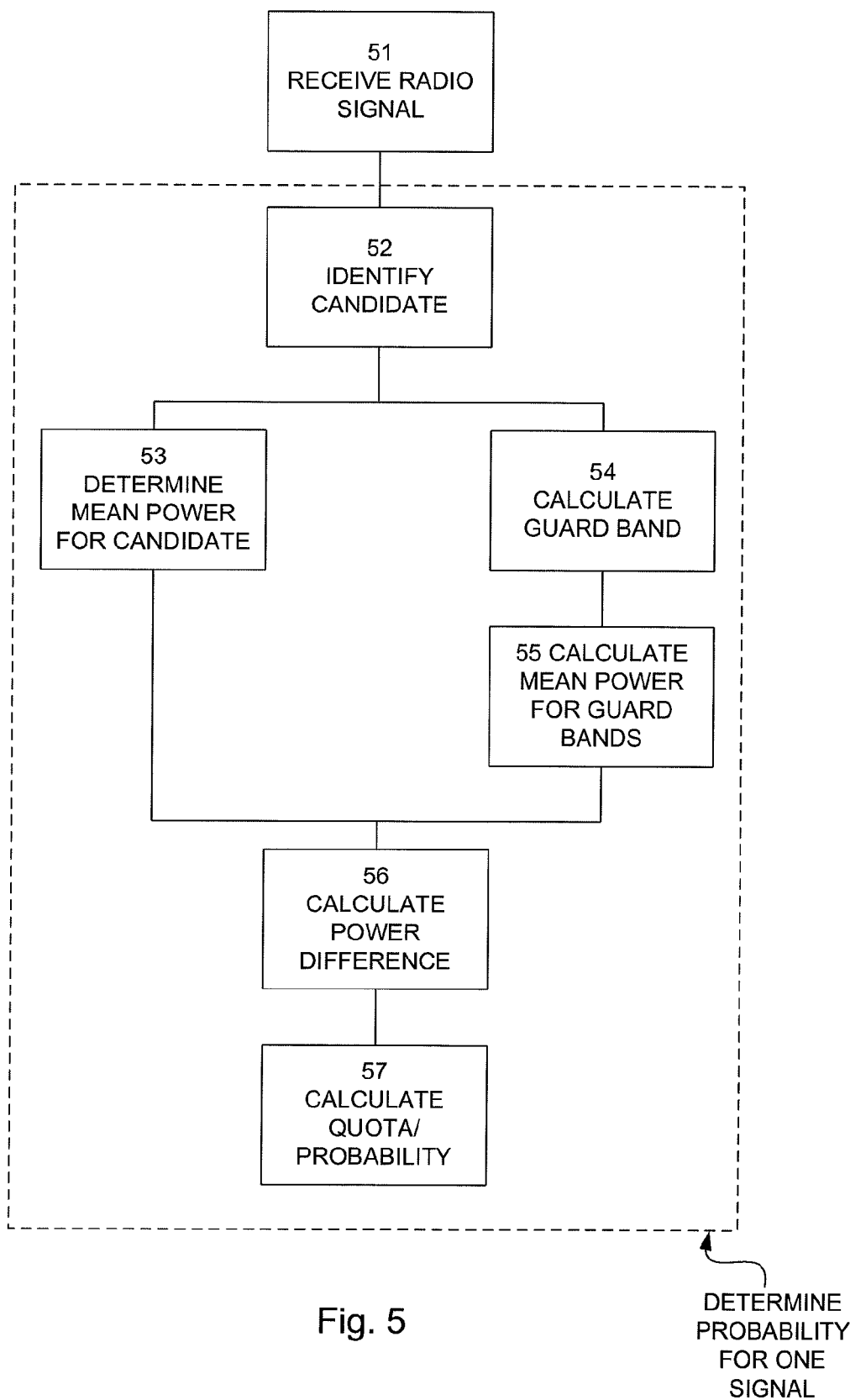
FIG. 5 shows a flowchart for a method according to one embodiment of the teachings of this application

FIG. 5 shows a flow chart of a method according to herein. The method is described step-by-step below with simultaneous reference to FIG. 7:

51. A signal 700 is received through a radio receiver and scanned to generate a frequency spectrum as shown in FIG. 7;

52. A candidate is identified (in FIG. 7 two candidates are identified 710a and 710b) as is disclosed above and in the European Patent Application EP08853764.2 and thereby establishing a Carrier frequency. An RAT is assumed (or hypothesized) and from this the Bandwidth (BW) is determined;

53. Mean Power of the candidate is calculated, Pc;
54. The size and location of the guard band(s) 730a and 730b is calculated through the data available for an assumed (or hypothesized) RAT;
55. Mean Power of the guard band is calculated, Pg (in one embodiment the mean power is calculated for both guard bands on either side of the assumed (or hypothesized) carrier);
56. The power difference between the candidate 720a and 720b and the guard band is calculated (Equation 1); and
57. The probability indication Prob is calculated as the ratio between the power difference and the power of its assumed (or hypothesized) carrier bandwidth, Pc (Equation 2).

If the mean power of the transmission band Pt is measured this equals the power difference that is calculated in 56. The true candidate 750 is marked in FIG. 7 with a vertical line.

Equation 3 (3a) and Equation 4 (4a) show the behavior of this probability measure in linear representation.

$$\lim_{Pg \to Pt} \frac{Pt - Pg}{Pt} = \frac{Pt - Pt}{Pt} = 0 \qquad \text{Equation 3}$$

Equation 3 shows the case when the average power of the transmission band is used as Pc in equation 2 and when the average power of the guard band reaches the same level as the average power of the assumed (or hypothesized) candidate transmission band. Then, the probability goes to zero. That is, when the guard band holds as much power as the assumed (or hypothesized) candidate transmission band it is unlikely to be a true candidate. The same holds true when the average power of the transmission band plus the guard band is used as Pc in equation 2 and when the guard band holds most of the power of the assumed (or hypothesized) candidate. Then, the probability goes to zero, see Equation 3a.

$$\lim_{Pg \to Pc} \frac{Pc - Pg}{Pc} = \frac{Pc - Pc}{Pc} = 0 \qquad \text{Equation 3a}$$

In the situation when the average power of the transmission band plus the guard band is used as Pc in equation 2 and when the average power of the guard band reaches the same level as the average power of the assumed (or hypothesized) candidate transmission band, the probability would go to 0.5.

$$\lim_{Pg \to 0} \frac{Pc - Pg}{Pc} = \frac{Pc}{Pc} = 1 \qquad \text{Equation 4}$$

Equation 4 shows the behavior the average power of the transmission band plus the guard band is used as Pc in equation 2 and when the average power of the guard band is small compared to the average power of the assumed (or hypothesized) candidate. Then, the probability goes to 1. That is, when the power of the transmission band of the assumed (or hypothesized) candidate is much greater than the energy of its guard band it is more likely to be a true candidate. The same holds true if the average power of the transmission band is used as Pc in equation 2 and the average power of the guard band is small compared to the average power of the assumed (or hypothesized) candidate.

It should be noted that the methods and equations given herein are applicable for probability determinations based on the mean power of the guard band and the mean power of the whole candidate (Pc=Pt+Pg), such as in equations 1, 2, 3a and 4a, as well as for probability determinations based on the mean power of the guard band and the mean power of the transmission band, such as in equations 3 and 4. For a true candidate the transmission band will contain the bulk of the power in a signal so the same reasoning applies as Pc~Pt, when Pg is small.

Figure 6:
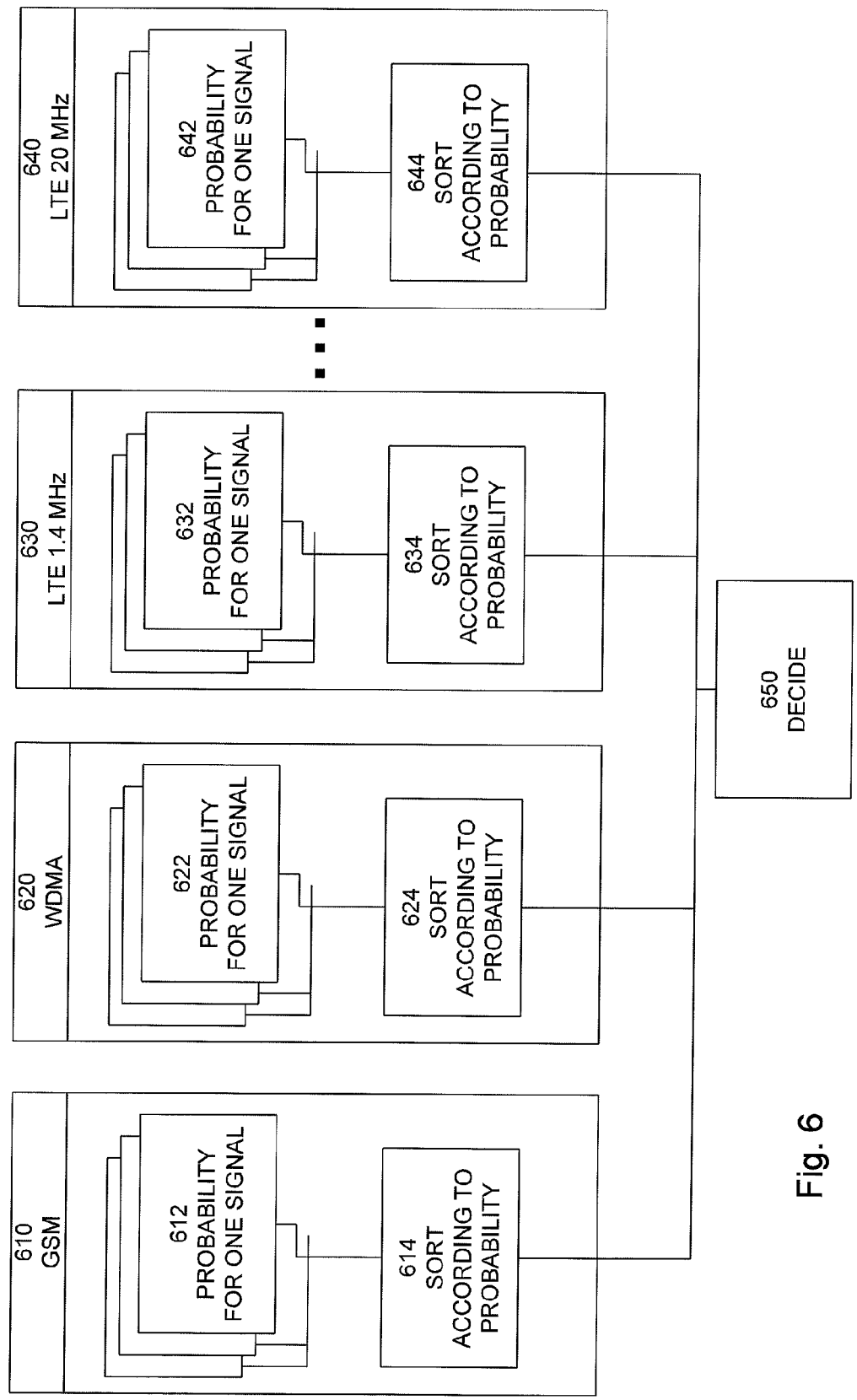
FIG. 6 shows a flowchart for a method according to one embodiment of the teachings of this application.

The basic flow shown in FIG. 5 is for one candidate only but could be applied for all candidates. The dashed box in FIG. 5 indicates the probability calculation that is to be performed for one candidate. In one embodiment the controller 210 is configured to identify all candidates and then apply the probability calculation for all candidates, assuming one RAT at the time. In one embodiment the controller 210 is configured to perform the identification and calculation in parallel for more than one assumed (or hypothesized) RAT. In one embodiment the controller 210 is configured to identify a candidate and then apply the probability calculation for all assumed (or hypothesized) RATs, one candidate at the time In one embodiment the controller 210 is configured to perform the identification and probability calculation in parallel for more than one candidate. FIG. 6 shows an example of how the basic flow of FIG. 5 can be used cross-RAT and BW. The controller is configured to assume (or hypothesize) one RAT (and bandwidth for LTE) at a time. In one embodiment the controller 210 is configured to perform the calculations in parallel for the assumed (or hypothesized) RAT (and bandwidth for LTE). In FIG. 6 this is indicated by the RAT (and bandwidth for LTE) boxes 610, 620, 630, and 640 representing the RATs GSM, WCDMA, LTE 1.4 MHz and LTE 20 MHz respectively. For each RAT the controller calculates the probability 612, 622, 632, 642 (corresponding to actions 440 of FIGS. 4 and 52 to 57 of FIG. 5) for each signal or candidate according to information on bandwidth derived from the assumed (or hypothesized) corresponding RAT. In other words, the controller 210 first calculates the probability that a candidate is a GSM channel for all candidates, secondly the controller 210 first calculates the probability that a candidate is a WCDMA channel for all candidates, thirdly the controller 210 calculates the probability that a candidate is a LTE 1.4 MHz channel for all candidates and thereafter the controller 210 calculates the probability that a candidate is a LTE 20 MHz channel for all candidates. The order of these calculations is only for exemplary purposes and it should be clear that any order is within the scope of the teachings herein. In on embodiment the calculations are performed in parallel. The controller 210 thereafter sorts 614, 624, 634, 644 the candidates according to the probabilities and then decides 650 based on the calculated probabilities which candidate, that is which carrier frequency, which RAT and possibly (for LTE) which BW, to connect to. In one embodiment the candidates are sorted irrespective of the assumed (or hypothesized) RAT.

The apparatus according to the teachings herein thus provide for a manner of quickly and easily deciding on which carrier to connect to by calculating a probability value based on the energy levels alone without requiring any synchronization attempts.

EXAMPLE 1

Differentiation Between WCDMA and LTE 5 MHz

Figure 8:
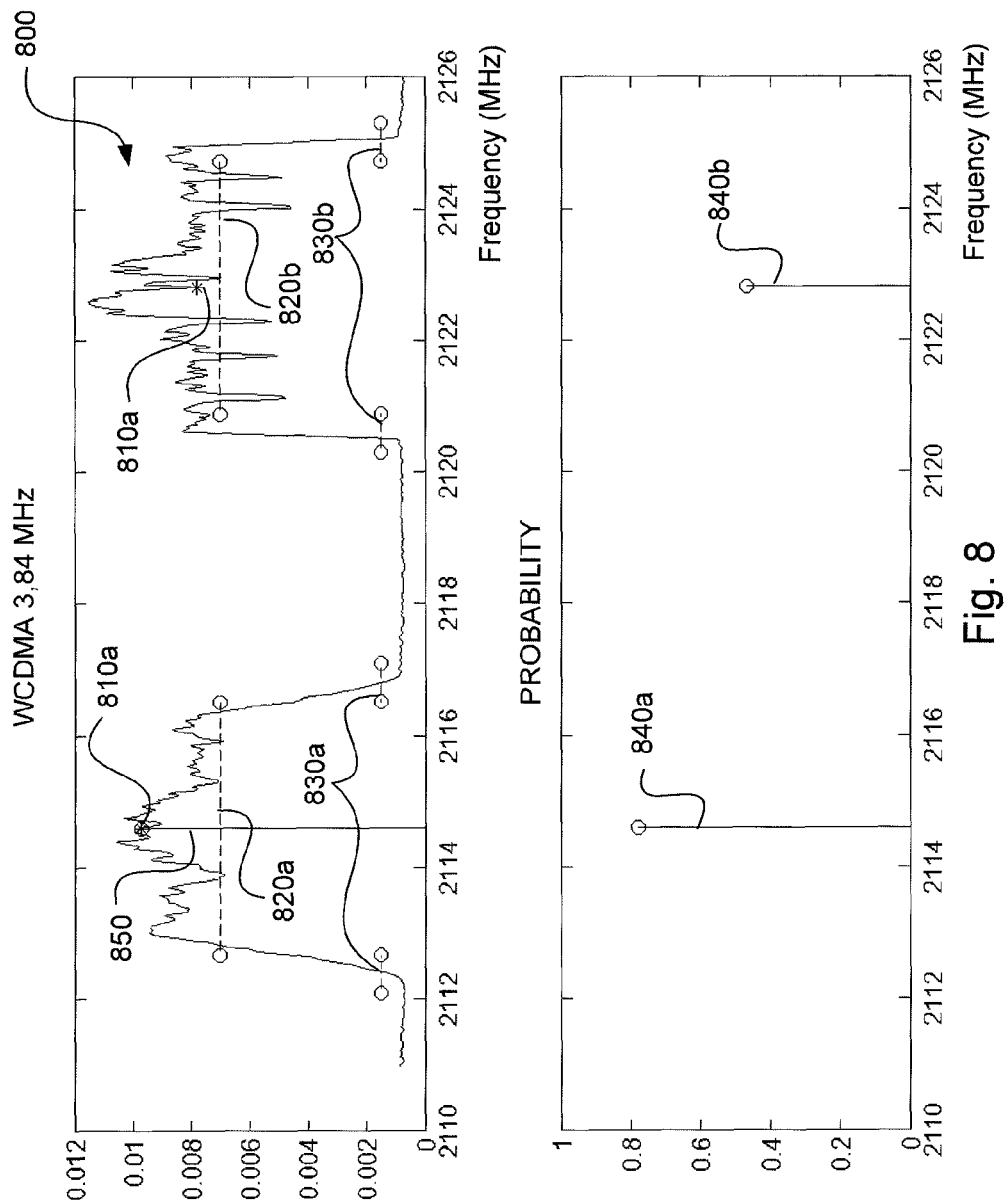
FIG. 8 shows a graph for a detected radio signal received at an apparatus and the calculated probabilities for the received signal according to one embodiment of the teachings of this application.

FIG. 8 shows two frequency graphs. The upper graph shows the energy of a received radio signal 800 at frequencies between 21 MHz and 36 MHz (in FIG. 8 the x-axis is presented in steps of 15 kHz). The lower graph shows the probabilities 840a-b for two candidate signals found in the upper graph. The upper graph of FIG. 8 is the same graph as in FIG. 7. FIG. 8 shows a scenario where two cells are present; 1 WCDMA (2114.6 MHz) and 1 LTE 5 MHz (2122.8 MHz). Two candidates or cells have been identified as possible WCDMA and are marked with asterisks 810a-b. Assuming that the RAT for the two candidates is WCDMA transmission bands 820a and 820b and guard bands 830a and 830b are determined (marked with dashed lines). The probabilities 840a and 840b for the two candidates 840a and 840b are calculated and plotted in the lower graph. Calculating the probability for WCDMA will give $P_1$=0.78 for the left candidate 810a and $P_2$=0.47 for the right candidate 810b. As can be seen, the left candidate 810a shows a higher probability 840a for being a WCDMA channel than the right candidate 810b; hence the true WCDMA is ranked most probable. The true candidate 810a is marked in the upper graph with a vertical line 850.

EXAMPLE 2

Low Powered GSM Cell Compared to High Power Erroneous GSM Detection

FIG. 9 shows two frequency graphs. The upper graph shows the energy of a received radio signal 900 at frequencies between 0 MHz and 52.5 MHz. The lower graph shows the probabilities for candidate signals identified in the upper graph. FIG. 9 shows a scenario where three cells are present; 1 GSM (carrier frequency 2107 MHz in FIG. 9), 1 WCDMA (carrier frequency 2114.6 MHz in FIG. 9) and 1 LTE 5 MHz (carrier frequency 2122.8 MHz in FIG. 9). In this example 9 candidates 910 are identified as GSM (asterisk). The probability 940 for each candidate is plotted in the lower graph. Calculating the probability for GSM will give $P_1$=0.65 for the left-most candidate and the rest of the detected candidates are around probabilities between 0 and 0.25 hence the true GSM is ranked most probable which is also clear from the lower graph. The true candidate 950 is marked with a vertical line in the upper graph.

The prior-art solution EP08853764.2 reduced the cell search hypothesis testing efforts by identifying the exact carrier location and the total BW, but required subsequent RAT-specific synch attempts to determine the actual RAT format.

The teachings of this application makes it possible to rate the identified candidates relative to each other, regardless of RAT or BW, without requiring a synchronization attempt for each possible candidate configuration. The synchronization is only required for the chosen carrier. It will differentiate between high-powered erroneous detected candidates in favor of low-powered true candidates. This is highly beneficial since the (absolute) power level of a candidate does not imply anything as such about the radio access technology that the candidate belongs to. As should be realized a low power candidate may have a shape that makes it a more likely candidate than a high power candidate that has a different shape.

It thus provides complementary functionality and added value to the baseline architecture—the search complexity is reduced by sorting the candidates in probability order and/or immediately excluding the irrelevant RAT and BW combinations.

One benefit of the teachings herein is that the determination of possible Carrier frequencies and/or RATs (bandwidths) is much faster and requires less computational resources as it is adapted to only view the energy levels of a spectrum and does not require any synchronisation.

Another benefit is that the teachings disclosed herein identify a carrier frequency and by assuming a RAT there is no need to study, detect or estimate bandwidths. They are known from the assumed (or hypothesized) RAT. This finds beneficial use for signals having a spectrum with a character that is flat. This also finds beneficial use for signals being closely arranged or even overlapping.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has mainly been described above with reference to a few embodiments. However, as is readily appreciated by a person skilled in the art, other embodiments than the ones disclosed above are equally possible within the scope of the invention, as defined by the appended patent claims.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |
| Transmission bandwidth configuration [MHz] | 1.08 | 2.7 | 4.5 | 9.0 | 13.5 | 18.0 |
| Guard band on each side [kHz] | 160 | 150 | 250 | 500 | 750 | 1000 |

Extraction of LTE transmission bandwidth configuration

The invention claimed is:

1. An apparatus for use in a telecommunications system, said apparatus comprising:
   a memory, and
   a controller, configured:
      to receive a signal within a radio frequency bandwidth;
      to identify a first candidate carrier frequency in the received radio frequency bandwidth, based on the signal;
      for each among potential radio access technologies, to determine a probability estimate for the first candidate carrier frequency being a carrier frequency of the potential radio access technology, where in the probability estimate is based on a channel power received in a channel band of the potential radio access technology, the channel band including the first candidate carrier frequency, and on a guard power received in a guard band of the channel band according to the potential radio access technology; and
      to select one of the potential radio access technologies based on determined probability estimates related to the first candidate carrier frequency.

2. The apparatus according to claim 1, wherein said controller determines said probability estimate for the first candidate carrier frequency by:
   determining a size and a location of the guard band according to the potential radio access technology,
   using, as the channel power, an average power received in the channel band;
   using, as the guard power, an average power received in the guard band;
   determining a difference between said channel power and said guard, and
   calculating said probability estimate as a quota between the difference and said channel power.

3. The apparatus according to claim 1, wherein said controller is further configured:
   to determine a size and a location of the guard band according to the potential radio access technology;
   to use, as the guard power, an average guard power received in said guard band;
   to use, as the channel power, an average channel power received in the channel band; and
   to calculate said probability estimate as a quota between the guard power and channel power.

4. The apparatus according to claim 1, wherein said controller is further configured:
   to determine a size and a location of a transmission band within the channel band according to the potential radio access technology;
   to use, as the channel power, an average power received in the channel band, the channel power being expressed using a logarithmic scale;
   to determine an average power received in the transmission band the average power being expressed using a logarithmic scale; and
   to calculate said probability estimate as a logarithmic difference between the average power received in the transmission band and the channel power.

5. The apparatus according to claim 1, wherein said controller is further configured:
   to determine a size and a location of the guard band according to the potential radio access technology
   to use, as the guard power, an average power received in said guard band, the guard power being expressed using a logarithmic scale;
   to use, as the channel power, an average power received in the channel band, the channel power being expressed using a logarithmic scale; and
   to calculate said probability estimate as a logarithmic difference between the power and the channel power.

6. The apparatus according to claim 1, wherein said controller is further configured:
   to identify a second candidate carrier frequency; and
   to determine a second probability estimate for said second candidate carrier frequency being a carrier of the selected radio access technology.

7. The apparatus according to claim 6, wherein said controller is further configured to sort said first candidate carrier frequency and said second candidate carrier frequency according to said probability estimate and said second probability estimate.

8. The apparatus according to claim 1, wherein said controller is further configured:
   to identify the first candidate carrier frequency by performing a FFT scan over the radio frequency band, to get a power spectral density estimate; and
   to detect whether the received signal pertains to cellular systems employing different bandwidths by applying a radio access technology matching filter.

9. The apparatus according to claim 1, wherein said controller is further configured:
   to identify the first candidate carrier frequency as being each of a series of frequencies spanning the radio frequency bandwidth; and
   perform a sweeping probability calculation of the probability estimate for each frequency of the series.

10. The apparatus according to claim 1, wherein said controller is further configured:
    to identify the first candidate carrier frequency by performing a FFT scan over the radio frequency bandwidth; and
    applying a matching filter designed to filter out low energy signals.

11. A mobile communications device for use in a telecommunications system, said mobile communications device comprising an apparatus having a memory and a controller configured:
    to receive a signal within a radio frequency bandwidth;
    to identify a first candidate carrier frequency in the received radio frequency bandwidth, based on the signal;
    for each among potential radio access technologies, to determine a probability estimate for the first candidate carrier frequency being a carrier frequency of the potential radio access technology, where in the probability estimate is based on a channel power received in a channel band of the potential radio access technology, the channel band including the first candidate carrier frequency, and on a guard power received in a guard band of the channel band according to the potential radio access technology; and
    to select one of the potential radio access technologies based on determined probability estimates related to the first candidate carrier frequency.

12. A method for use in a telecommunications system, said method comprising:
    receiving a signal within a radio frequency bandwidth;
    identifying a first candidate carrier frequency in the radio frequency bandwidth, based on the signal;
    for each among potential radio access technologies, determining a probability estimate for the first candidate carrier frequency being a carrier frequency of the potential radio access technology, where in the probability estimate is based on a transmission power received in a transmission band of the potential radio access technology and on a guard power in a guard band of the transmission band according to the potential radio access technology; and
    selecting one of the potential radio access technologies based on determined probability estimates related to the first candidate carrier frequency.

13. A non-transitory computer readable medium storing executable codes when executed by a data processing unit to perform a method for use in a telecommunications system, said method comprising:
    receiving a signal within a radio frequency bandwidth;
    identifying a first candidate carrier frequency in the radio frequency bandwidth, based on the signal;
    for each among potential radio access technologies, determining a probability estimate for the first candidate carrier frequency being a carrier frequency of the potential radio access technology, where in the probability estimate is based on a transmission power received in a transmission band of the potential radio access technology and on a guard power in a guard band of the transmission band according to the potential radio access technology; and selecting one of the potential radio access technologies based on determined probability estimates related to the first candidate carrier frequency.

* * * * *